United States Patent [19]

Geyer et al.

[11] 4,449,139
[45] * May 15, 1984

[54] OPTICAL DISC UNIT, FABRICATION METHOD AND COOPERATING WRITE AND/OR READ APPARATUS

[75] Inventors: Frederick F. Geyer; Eric M. Leonard, both of Rochester, N.Y.

[73] Assignee: Eastman Kodak Company, Rochester, N.Y.

[ * ] Notice: The portion of the term of this patent subsequent to Dec. 21, 1999 has been disclaimed.

[21] Appl. No.: 411,773

[22] Filed: Aug. 26, 1982

Related U.S. Application Data

[63] Continuation of Ser. No. 264,313, May 18, 1981, Pat. No. 4,365,258.

[51] Int. Cl.³ ............................................. G01D 15/32
[52] U.S. Cl. ..................................... 346/137; 369/287
[58] Field of Search ................... 346/137, 135.1, 76 L; 369/283, 284, 286, 287, 291, 270, 271

[56] References Cited

U.S. PATENT DOCUMENTS

| | | | |
|---|---|---|---|
| 3,336,583 | 8/1967 | Comstock | 340/174.1 |
| 3,359,549 | 12/1967 | Farrand et al. | 340/174.1 |
| 3,373,413 | 3/1968 | Treseder | 340/174.1 |
| 3,381,085 | 4/1968 | Johnson et al. | 178/6.7 |
| 3,805,292 | 4/1974 | Hashiguchi et al. | 360/135 |
| 4,038,663 | 7/1977 | Day | 346/137 X |
| 4,074,282 | 2/1978 | Balas | 346/137 X |
| 4,360,908 | 11/1982 | Howe | 346/76 L X |
| 4,365,257 | 12/1982 | Gerfast | 346/137 X |
| 4,380,769 | 4/1983 | Thomas | 346/76 L X |

*Primary Examiner*—Joseph W. Hartary
*Attorney, Agent, or Firm*—John D. Husser

[57] ABSTRACT

An optical disc-unit including (i) a flexible, disc-shaped support bearing a record layer, (ii) a flexible disc-shaped cover sheet which is transparent to write/read light and (iii) annular retaining means which engage the support and sheet, in spaced relation, substantially continuously around peripheral regions. In preferred embodiments the retaining means symmetrically tension the sheet and support into substantially flat dispositions. Cooperative optical disc write/read apparatus and optical disc-unit fabrication methods are also disclosed.

27 Claims, 14 Drawing Figures

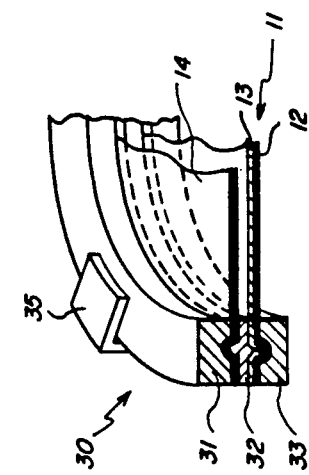
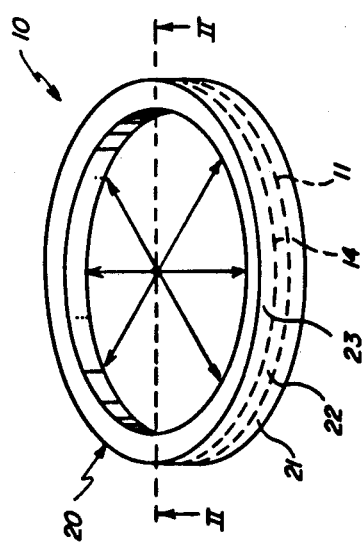
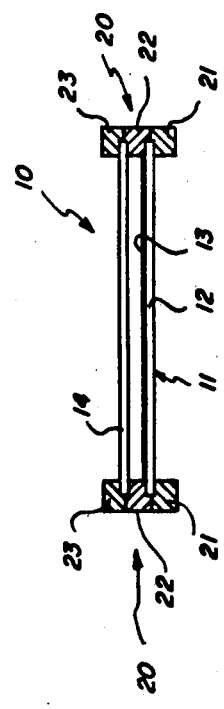

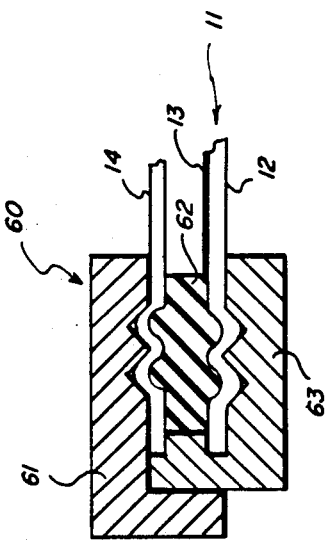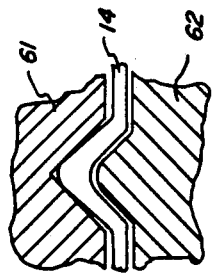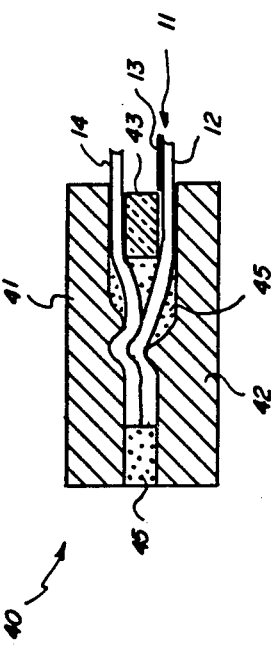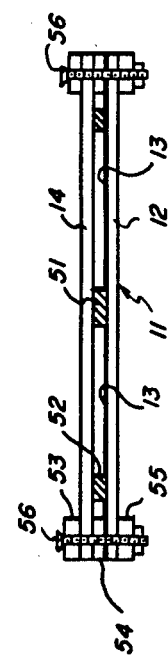
FIG. 6a
FIG. 6b
FIG. 4
FIG. 5

OPTICAL DISC UNIT, FABRICATION METHOD AND COOPERATING WRITE AND/OR READ APPARATUS

This application is a continuation of U.S. application Ser. No. 264,313, entitled "Improved Optical Disc Unit, Fabrication Method And Cooperating Write And/Or Read Apparatus", filed May 18, 1981, in the name of F. F. Geyer and E. M. Leonard now U.S. Pat. No. 4,365,258.

CROSS-REFERENCE TO RELATED APPLICATIONS

Reference is made herein to U.S. patent application Ser. No. 023,434, filed Mar. 23, 1979, in the names of Thomas and Wrobel, abandoned and refiled as continuation Ser. No. 184,554, filed Sept. 5, 1980, now U.S. Pat. No. 4,380,769, and U.S. patent application Ser. No. 124,381, filed Feb. 25, 1980, in the names of Howe and Wrobel now U.S. Pat. No. 4,360,908.

BACKGROUND OF THE INVENTION

1. Field of the Invention

The present invention relates to record medium and apparatus useful in optical writing and/or reading of high density information and more particularly to improved configurations for optical discs and cooperating optical disc apparatus.

2. Description of the Prior Art

The currently preferred optical disc technology employs disc elements with spiral or concentric tracks of minute (e.g., on the order of a micron or less in size), optically-detectable marks. One real-time mode of recording (writing) such marks is by scanning tracks on the disc with an equivalently small beam of radiation (e.g., from a laser) which is modulated "off or on" according to an electrical signal representative of the information to be written. Information is recovered (read) by scanning the tracks with a larger, but still very tightly focused radiation (e.g. light) spot. The recovered information is in the form of a fluctuating electrical signal obtained from a photodetector that senses the read-out light reflected from the recorded disc. The benefits (e.g. high data storage density) inuring to recording with such small marks are very important; however, the problems encountered in precise implementation of the approach are very difficult. For example, focus of the write or read beam should be maintained with precision and the record surface should be protected e.g. from dirt and scratches.

More specifically, in order to write and read information in the form of such minute markings, optical systems of high numerical aperture are used to focus light to equivalently minute spots. Such optical systems have extremely small depths of focus and the proper positional relation between the writing or reading optical system and the optical disc record surface must be stringently maintained. Therefore it is highly desirable that the record layer, and thus optical disc support surface underlying the record layer, be smooth (relatively free of high-spatial-frequency variations from a nominal plane, e.g. such as caused by minute pits or bumps) and flat (relatively free of large amplitude, low spatial frequency variations e.g. such as caused by undulating surface variation of the support). Although complex focus-servo devices can effect lens adjustment (from a nominal focal zone) to compensate for imperfect smoothness and flatness, these devices add to the cost and fragileness of the write/read apparatus. The degree of complexity of the focus-servo devices is proportional to the degree of such disc imperfections and the speed of operation.

One approach to achieve requisite smoothness and flatness has been to form the disc substrate of glass with a ground and polished surface. This requires a time consuming and costly fabrication procedure. Another approach is to mold a plastic disc substrate with a highly finished surface and apply a surface smoothing sub-layer. However, it is extremely difficult to mold such plastic discs having adequate surface characteristics with a good yield; and this support fabrication method is also relatively costly.

Several different approaches have been suggested for protecting the disc recording layer surface from dirt and scratches. One is to overcoat that surface with a transparent protective layer of sufficient thickness to locate the exterior protective surface out of the depth of focus of the optical system. However, protective layers of this thickness require complicated optical correction of aberrations and can present problems in certain deformation recording processes for the recording layer. An alternative approach described in U.S. Pat. No. 4,038,663 is to centrally attach a flexible disc cover (in spaced relation to the record surface of a rigid optical disc) and "fly" the cover sheet above the record layer during write or read operations. Another approach disclosed in U.S. Pat. No. 4,074,282 provides inner and outer coaxial spacers to support a transparent cover plate in spaced relation from the record surface of a rigid optical disc.

While the above-noted and other protective layer or protective cover member approaches are useful to avoid scratch or dirt problems, they do not simplify the above-noted problems in meeting precise smoothness and flatness requirements.

SUMMARY OF THE INVENTION

One general purpose of the present invention is to provide improved optical disc and cooperating apparatus configurations to cope with the problems outlined above. Thus an important feature of the invention is to provide improved configurations for meeting smoothness, flatness and protective requirements in optical disc writing and/or reading.

One particularly desirable advantage of the present invention is that it obviates the use of rigid supports. This attribute is of great significance in fabrication, for the recording layer(s) can be applied to flexible webs in a continuous run, with many discs subsequently being cut from the web. Rigid disc formats are not readily susceptible to such coating techniques. Another desirable attribute of certain embodiments of the present invention is the enhancement of dimensional stability in the face of environmental stresses. This relaxes design requirements for cooperating apparatus, e.g. as tracking servo devices.

In one general aspect the present invention relates to an improved optical disc-unit adapted for the writing and/or reading of high density information and comprising (i) an optical disc including a flexible, disc-shaped support carrying a record layer; (ii) a disc cover, opposing the record layer, comprising a flexible, disc-shaped sheet which is substantially transparent to such writing and/or reading wavelengths and which is generally coextensive with the optical disc and (iii) annular retaining means, engaging said support and said sheet around respective annular peripheral regions, for positioning the sheet and record portions of the opposing record layer in spaced relation. In particularly preferred embodiments central portions of the flexible sheet and flexible support are held in cylindrically-symmetric tension by said retaining means. In other preferred embodiments the support and cover sheet are continuous surfaces and the retaining means cooperates with the retained sheet and support portions to substantially seal the space between the continuous sheet and support. In other preferred embodiments the optical disc support is held in a relatively lower tension by the retaining means, which further includes index surface means for positioning said support in an abutting relation with a tensioning and/or positioning surface of optical disc write/read apparatus. Thus the optical disc-unit can be stored with the optical disc in such relatively lower tension and used with the optical disc in a relatively higher tension to enhance its flatness.

In a related aspect the present invention relates to optical disc write/read apparatus adapted to receive, predeterminedly position and/or tension such an optical disc-unit. In another related aspect the present invention relates to improvements in optical disc apparatus comprising such a disc-unit and cooperative receiving, positioning and/or tensioning structure. In another aspect the present invention relates to improved methods for fabricating optical disc units. Other improvements and advantages of the present invention will become more evident in view of the subsequent description of preferred embodiments of the invention.

BRIEF DESCRIPTION OF THE DRAWINGS

The description of preferred embodiments refers to the attached drawings wherein:

FIG. 1 is a perspective view of one preferred optical disc-unit configuration illustrating the general approach of the present invention;

FIG. 2 is a sectional view of the FIG. 1 disc-unit configuration;

FIG. 3 is a fragmented perspective view of a portion of one specific disc-unit configuration in accord with the present invention;

FIG. 4 is a cross-sectional view of a portion of an alternative disc-unit embodiment;

FIG. 5 is a cross-sectional view similar to FIG. 2 but of another embodiment of the present invention;

FIGS. 6-A and 6-B are cross-sectional views of portions of another alternative preferred disc-unit embodiment;

DETAILED DESCRIPTION OF THE PREFERRED EMBODIMENTS

Figure 7:
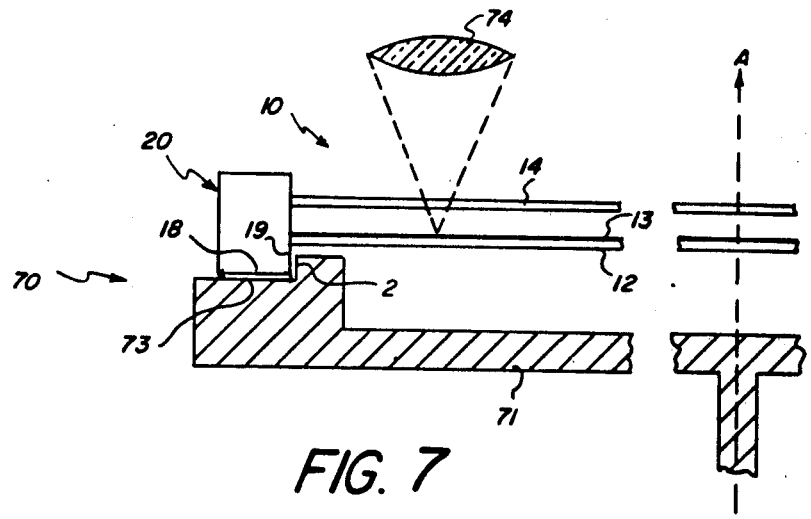
FIG. 7 is a schematic fragmented sectional view of an optical disc-unit and cooperative optical disc apparatus in accordance with the present invention.

Referring to FIGS. 1 and 2, the general approach of optical disc-unit configurations in accord with the present invention can be explained. Thus, the optical disc-unit 10 includes an optical disc 11 in the form of a continuous, flexible, disc-shaped support 12 having recording layer 13 (and other appropriate layers) formed on one major surface of the support. The disc-unit also includes a disc cover in the form of a continuous, flexible, disc-shaped sheet 14 which is substantially transparent with respect to the write and/or read wavelength suitable for use with the record layer 13. The diameter of the disc cover sheet 14 corresponds generally to the diameter of the optical disc 11, and, as shown, both elements are supported in spaced relation by support structure of the disc-unit 10 which engages peripheral annular regions of those elements.

More particularly the disc-unit 10 includes annular retaining means, denoted generally 20, which engage the optical disc support 12 and the cover sheet 14 substantially continuously around respective annular peripheral regions in a manner positioning central portions of those elements into spaced relation. It is highly preferred that the cover sheet 14 and disc support be retained in cylindrically-symmetric tension, and in the FIGS. 1 and 2 embodiment this is accomplished by cooperating annular ring members 21, 22 and 23. It is also highly preferred in accordance with the present invention that the cooperative engagement between the disc support 12, cover sheet 14 and retaining means 20 significantly seal the space between the recording layer 13 (on support 12) and the inner surface of the cover sheet 14. Various preferred specific retaining means configurations for achieving these results will be described subsequently; however first a brief description of useful and preferred characteristics for the optical disc support and the cover sheet is appropriate.

Considering first the optical disc support, thickness uniformity, strength, dimensional stability and surface quality are significant characteristics to be considered in selecting a support material. In general, plastic materials, e.g. extruded and biaxially oriented Estar polyethylene terephthalate film base, provide desirable supports. However, other materials, e.g. thin metal films are also useful.

Thickness uniformity is important in support selection to minimize large amplitude, low spatial frequency vertical displacements of the supported recording layer. In general, support thickness variation usually varies, as a fixed percentage (e.g. 5%) with total support thickness. For this reason supports with nominal thicknesses less than about 10 mils are preferred.

With regard to strength, the supports preferably have a sufficiently high Young's modulus to sustain utilized tension stresses with small strain. This is particularly important when using recording layers susceptible to fracture or similar distortion by support strains. The support also is desirably highly stable dimensionally with respect to environmental stresses resulting from excursions of relative humidity and/or temperature. This characteristic has particular significance because non-uniform dimensional changes could distort record information. Additionally it is preferred that support materials have relatively high dimensional stability (compared to other plastic materials) in regard to loss of tension over time. Such loss of tension can cause support sag and materials with relatively long relaxation times therefore are preferred. Another preferred aspect for supports is a good surface quality compatible with coating of a smoothing layer.

Now considering the cover sheet, it is important that it be highly optically transparent at write and/or read wavelengths to be utilized. The cover sheet also should be substantially non-birefrigent, substantially homogeneous and free from striae and occlusions of an extent that would interfere with recording and reading. Also, it is desirable that thickness variation of the cover sheet be sufficiently small to allow for simple correction of aberrations incident to light passage therethrough. The nominal thickness preferably is of a magnitude (e.g. less than about 300μ) where normal, high quality, high numerical aperture objectives are available. The strength and dimensional stability characteristics of the cover sheet desirable are like those described above with respect to the optical disc supports.

A specific exemplary preferred optical disc support is biaxially oriented Estar film base of 4 mil nominal thickness having a Young's modulus of approximately $6.8 \times 10^5$ psi. A specific exemplary preferred cover sheet is solvent cast cellulose triacetate (such as the support of Eastman Color Negative Film 5247) of 5.25 mil nominal thickness and having a Young's modulus of approximately $6 \times 10^5$ psi.

The preferred operative spacing between optical disc 11 and cover sheet 14 depends on the numerical aperture of the lens utilized, the thickness of the cover sheet and the desired degree of protection from dirt and scratches on the external cover sheet surface. For a cover sheet having a refractive index of n=1.5, the table set forth below illustrates useful minimum operative spacings "S" (i.e., between the recording surface and the bottom of the disc cover in the utilized portion of the disc) that will provide the same degree of protection from dust, scratches, etc., as does a 1 mm thick, in situ, transparent overcoat of index n=1.5 used with a 0.5 NA lens. The table lists S for various NA lenses and cover sheet thicknesses of 100μ, 133.4μ and 175μ.

| NA | S(100μ) | S(133.4μ) | S(175μ) |
| --- | --- | --- | --- |
| 0.5 | 0.545 mm | 0.5246 mm | 0.4991 mm |
| 0.6 | 0.4085 mm | 0.3891 mm | 0.3648 mm |
| 0.65 | 0.353 mm | 0.3342 mm | 0.3108 mm |
| 0.7 | 0.3032 mm | 0.2853 mm | 0.2629 mm |
| 0.75 | 0.2578 mm | 0.2408 mm | 0.2196 mm |
| 0.8 | 0.2152 mm | 0.1994 mm | 0.1797 mm |
| 0.85 | 0.1743 mm | 0.1601 mm | 0.1423 mm |
| 0.9 | 0.1332 mm | 0.1211 mm | 0.1059 mm |
| 0.95 | 0.08814 mm | 0.0792 mm | 0.06797 mm |

In view of the "S" values shown in the above table, it will be appreciated by one skilled in the art, normal working distances (the value of S+0.001" to 0.004" for clearance between the top of the cover and the lens) pertain, thus biological objectives can be used.

At this stage, it also should be noted that the optical disc-unit approach of the present invention is useful with a wide variety of recording systems (i.e. record stratum and cooperating write/read apparatus). In one particularly preferred recording system the record stratum 13 includes a deformable dye-binder layer with a reflective surface or reflective layer between the dye-binder layer and the support 12. Such dye-binder layers can be coated in continuous-runs on flexible webs and provide significant fabrication advantages. U.S. patent application Ser. No. 023,434, filed Mar. 23, 1979, abandoned and refiled as continuation Ser. No. 184,554, filed Sept. 5, 1980, now U.S. Pat. No. 4,380,769, in the names of Thomas and Wrobel, and U.S. patent application Ser. No. 124,381, filed Feb. 25, 1980, in the names of Howe and Wrobel, now U.S. Pat. No. 4,360,908, disclose preferred optical disc configurations. However, the record stratum can be of many other kinds known in the art, the significant aspect being that optical disc support 12 is flexible, preferably continuous, and has, as appropriate for a particular application, the other characteristics outlined above.

Referring now to FIG. 3, one preferred retaining means 30 for engaging and urging support 12 and cover sheet 14 into spaced relation can be seen. In general this embodiment comprises three cooperating annular rings, viz., upper ring 31, spacer ring 32 and lower ring 33. As shown, spacer ring 32 is located between annular peripheral portions of support 12 and cover sheet 14 and has raised flanges extending from central portions of its upper and lower surfaces at a location to cooperate in a fitting relation with corresponding grooves formed respectively in the central portions of upper and lower rings 31 and 33. When the sheet 14 and support 12 are located respectively between rings 31–32 and 32–33 and the rings are clamped together into fitting relation, both of those continuous, flexible, disc-shaped members are drawn into cylindrically symmetrical tension. This maintains the proper spaced relation between the members, maintains a flat orientation of the members and provides an air seal of the space between the members. Retaining clamps 35 are provided around the retaining means periphery to retain the press-fit cooperation of the rings.

FIG. 4 discloses another preferred embodiment for retaining means, denoted generally 40. In this embodiment upper and lower annular retaining rings 41 and 42 respectively have a cooperating female groove and male flange or rib extending around their opposing central surfaces. Spacer ring 43 is located between recessed inner portions of the more radially inward surfaces of rings 41 and 42. In fabrication of this disc-unit embodiment the spacer ring 43 is placed between support 12 and cover sheet 14, and adhesive 45 is provided between rings 41, 42 before they are clamped into their interfitting relation, which tensions the cover sheet and support and seals the space therebetween. The upper and lower rings are held in this interfitting relation until the adhesive is fixed.

FIG. 5 discloses another preferred embodiment of optical disc-unit 50 in accord with the present invention. In this embodiment a central spacer disc 51 is positioned (e.g. affixed to cover sheet 11) between the central portions of the cover sheet and the optical disc. Also, an annular spacer ring 52 is similarly positioned between outer regions of the cover sheet and optical disc. Of course, elements 51 and 52 can be used in combination or singly. The annular retaining means in this embodiment comprises retaining rings 53, 54 and 55 having aligned, circumferentially spaced holes adapted to receive bolts 56. In fabrication, the disc support and cover sheet are of larger diameter than illustrated and are grasped outside the retaining rings by means which appropriately tension them. The retaining means are then secured by bolts 56 and the outer portions of the support and cover sheet released and trimmed.

FIG. 6-A discloses another preferred embodiment of retaining means, denoted generally 60. This preferred configuration is similar to the FIG. 3 embodiment except that the spacer ring 62 has a plurality of convex flange portions or ribs which cooperate with angular "V-shape" grooves of upper and lower rings 61, 63. Also it will be noted that the outer sectors of upper and lower rings 61, 63 have coupled portions which cooperate to engage the retaining means portions in a tightly interfitting relation. In this embodiment the engagement is a force fit, however, cooperative thread portions or other means can be utilized. The engagement of the members 61, 62, 63 tensions the continuous, flexible cover sheet 14 and support 12 and seals the space therebetween. The specific flange-groove construction of this embodiment (see FIG. 6-B) provides space for cold flow of the sheet and support regions engaged therebetween and thus enhances firm retention. In a preferred mode of fabrication the cover sheet 14 and support 12 are placed between members 61, 62, 63 as shown and engaging force is applied first at the outer ring regions. This secures the outer periphery of the support and cover sheet. The groove and rib portions are then forced together to further secure and tension the cover sheet and support. The amount of tension can be controlled by the number and size of groove-rib portions.

With the foregoing explanation of exemplary preferred retaining means, various other configurations within the scope of this invention will occur to those skilled in the art. However, some description of general and preferred tension forces is appropriate. In general, preferred tensions for the optical disc support and cover sheet are from substantially zero to just below the elastic limit, or yield point, of those members. More specifically, the preferred tension depends upon the desired degree of planarity for the particular member (i.e. size, composition, etc.) used and upon the particular use mode for the disc-unit, as will be described in more detail subsequently. It is highly preferred that the disc support and cover sheet be supported in a manner positioning their operative write/read portions in proper spaced relation. This again will depend upon specific embodiment of disc-unit selected (e.g. whether a central spacer is provided). Preliminary testing indicates that cylindrical symmetric tension tends to enhance the dimensional stability of the retained member. Thus it is presently preferred that at least the optical disc support have sufficient tension (in its storage condition) to obtain this advantage. As mentioned, it is preferred that storage or operating tension be below the elastic limit of the particular member; however, in certain applications some yield can be acceptable as long as surface planarity remains in the desired tolerance. In general, it is highly preferred that the tension (particularly storage tension) be selected with respect to the support material so that the stressed material's continuous relaxation over time (i.e. material creep) is slow enough to insure adequate spacing and planarizing tension throughout the expected product life period.

Referring now to FIG. 7, one preferred embodiment of optical disc apparatus useful in combination with the above-described optical disc-units is shown. The apparatus 70 is similar to the various other optical disc write/read apparatus known in the art, and only the portions cooperating more directly with the present invention will be described in detail. Thus, apparatus 70 comprises a turntable 71 adapted for rotation on axis A by drive means (not shown). The turntable 71 includes receiving means having a reference surface 73 which is rotatable about axis A in a plane substantially normal to axis A. The receiving means also includes a centering surface 72 adapted to locate a received disc-unit in a predetermined relation (e.g. concentric) with respect to axis A. Apparatus 70 also includes an optical system, represented by lens 74, which is adapted to focus write/read light in a focal zone that is generally normal to the axis of rotation.

In FIG. 7, the optical disc-unit 10 is shown placed on the turntable 71. As illustrated, the retaining means 20 of the disc-unit 10 has an index surface 18 which is adapted to cooperate with reference surface 73 of the receiving means and precisely locate the recording layer 13 of disc-unit 10 in a predetermined location to the focal zone of lens 74. Retaining means 20 also has a centering surface 19 which cooperates with surface 72 of the receiving means to locate the disc-unit 10 in proper relation to the rotational axis A. The retaining means 20 of disc-unit 10 can be clamped, e.g. mechanically or magnetically, to the receiving means, and upon rotation the lens operates on the recording layer 13 through cover sheet 14 and the intervening air space. Thus scratches, dirt, etc., on the cover sheet are out of the depth of lens focus and do not impair writing or reading of the recording layer 13. Also, recording layer 13 is maintained in a flat, smooth condition (in its predetermined location relative to the focal zone of lens 74) with highly useful accuracy due to the tensioned condition of its support 12.

Figure 8:
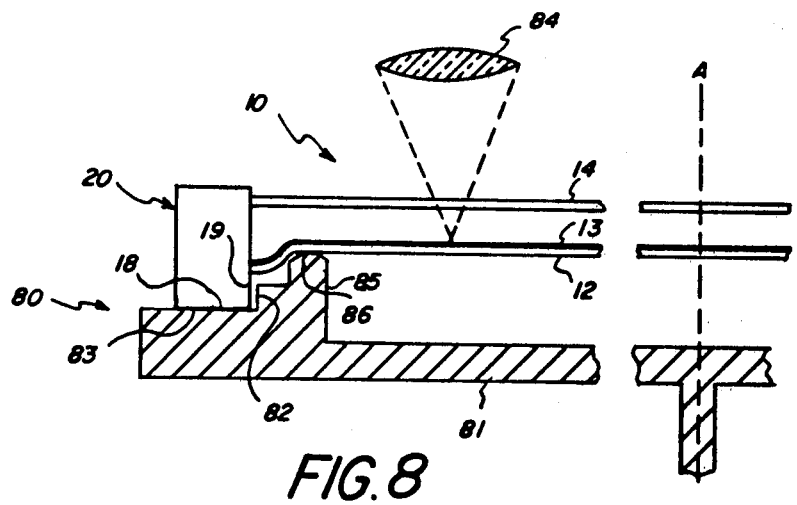
FIG. 8 is a view like FIG. 7 but of an alternative embodiment of optical disc-unit and cooperative optical disc apparatus.

Considering the foregoing it will be appreciated that, in the FIG. 7 embodiment, the proper location of recording layer 13 (relative to the lens 74) depends on proper dimensioning of both reference surface 73 and retaining means 20. Referring to FIG. 8, in an alternative preferred embodiment of the present invention, apparatus 80 significantly reduces the tolerances for retaining means 20 of disc-unit 10. Thus apparatus 80 is similar to the FIG. 7 embodiment having lens 84, turntable 81 and other typical structure for optical disc write/read apparatus. However as shown, apparatus 80 includes an annular flange 85 extending concentrically around the axis A of turntable rotation which provides an annular abutment surface 86. Surface 86 is carefully toleranced for rotation in a plane substantially normal to axis A and has predetermined dimensions (with respect to the location of the focal zone of lens 84 and the thickness of support 12) so that the recording layer 13 of a disc-unit 10 located on the turntable will be in the proper location with respect to the lens focal zone. Thus the internal tolerances of retaining means 20 (in locating support 12 relative to index surface 18) are significantly relaxed. Similarly the relation between reference surface 83 and index surface 18 is relaxed. The more readily controlled tolerance between centering surface 19 and surface 82 of the turntable receiving means again controls centering of the disc-unit 10 with respect to rotational axis A.

An additional feature of the FIG. 8 embodiment is significant. It will be noted that the relation of the turntable receiving means, retaining means 20 and abutment surface 86 is such that the support 12 is further tensioned (in cylindrically-symmetric directions) in response to its mounting in the receiving means. This affords the ability to construct disc-unit 10 so that support 12 is in a relatively low, "spacing" tension during storage and in a relatively high, "planarizing" tension during use. This feature can decrease long term failure of the support, which might occur in some materials, when stored in high tension. In addition, this aspect of the invention has the advantage of compensating for tension changes due to variation in the operating environment.

Figure 9:
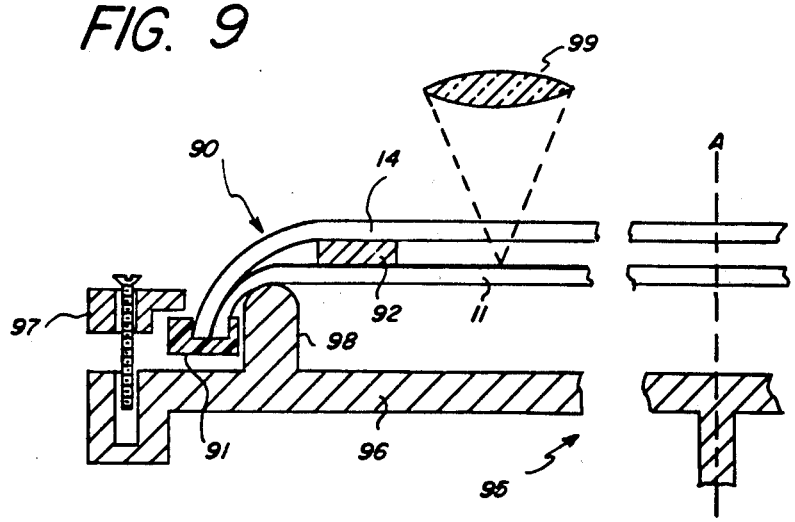
FIG. 9 is a view similar to FIG. 7 but of another embodiment of optical disc-unit and cooperative apparatus.

FIG. 9 illustrates yet another disc-unit 90 and cooperative apparatus 95 in accord with the present invention. Disc unit 90 comprises cover sheet 14 and optical disc 11 like those previously described. The peripheral portions of both of those members are heat formed to a downturned configuration as illustrated and engaged by a single annular clamp 91. A ring spacer 92 is provided between the opposing surfaces of those members at an outer region of the disc-unit. In this embodiment the disc cover and disc support are substantially self-supporting. In use the disc-unit 90 is placed on turntable 96 as illustrated and tensioning ring 97 is screwed down on the turntable to tension the sheet 14 and disc 11. Abutment flange 98 is precisely located to position the optical disc tensioned thereover in a predetermined location relative to the focal zone of lens 99.

Figure 10:
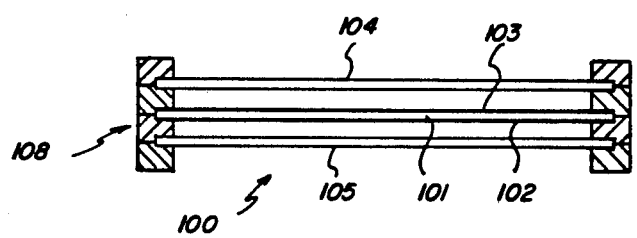
FIGS. 10 and 11 are views similar to FIG. 2 but of yet other embodiments of disc-units according to the present invention.
Figure 11:
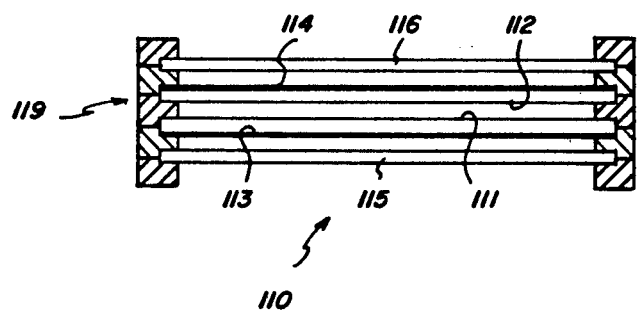

FIGS. 10 and 11 illustrate two-sided disc-unit configurations in accord with the present invention. The FIG. 10 embodiment comprises an optical disc support 101 having recording layers 102, 103 on opposite sides. This element can be two supports coated on one side and laminated together. Cover sheets 104, 105 oppose respective record surfaces positioned in spaced relation by retaining means 108, which can be formed of separate rings cooperating in any one of the previously described configurations.

The FIG. 11 embodiment 110 is similar to that shown in FIG. 10 but comprises two separate optical disc members 111, 112 retained by ring means 119 with respective opposing cover sheets 115, 116 also retained in spaced relation to their record layers 113, 114.

Figure 12:
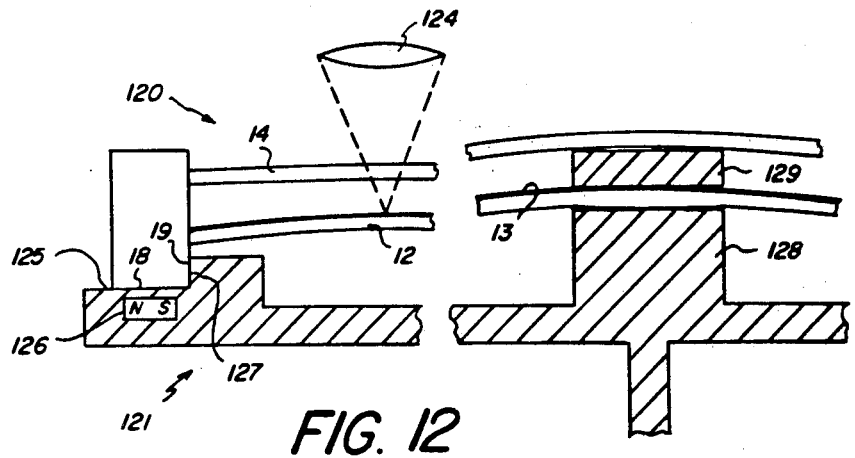
FIGS. 12–14 are schematic, fragmented sectional views illustrating other alternative embodiments of optical disc-unit and cooperative apparatus in accordance with the present invention.

FIG. 12 illustrates other preferred embodiments, viz., optical disc-unit 120 and cooperative apparatus 121. The apparatus 121 is similar to the FIG. 7 embodiment having a lens 124, turntable 122 and other typical structure for optical disc write/read apparatus. A reference surface 125 cooperates with index surface 18 of the disc-unit to locate the record layer in proper relation to the lens 124 (e.g. when held by magnet means 126). A centering surface 19 of the disc-unit similarly cooperates with surface 127 of the turntable to locate the disc-unit axially on the turntable. In this embodiment the turntable has a central abutment surface 128 which engages the central portion of the optical disc support to symmetrically tension the support. Also it will be noted that the disc-unit comprises a central spacer 129, generally concentric with surface 128 to maintain proper spaced relation between the optical disc and the cover sheet.

Figure 13:
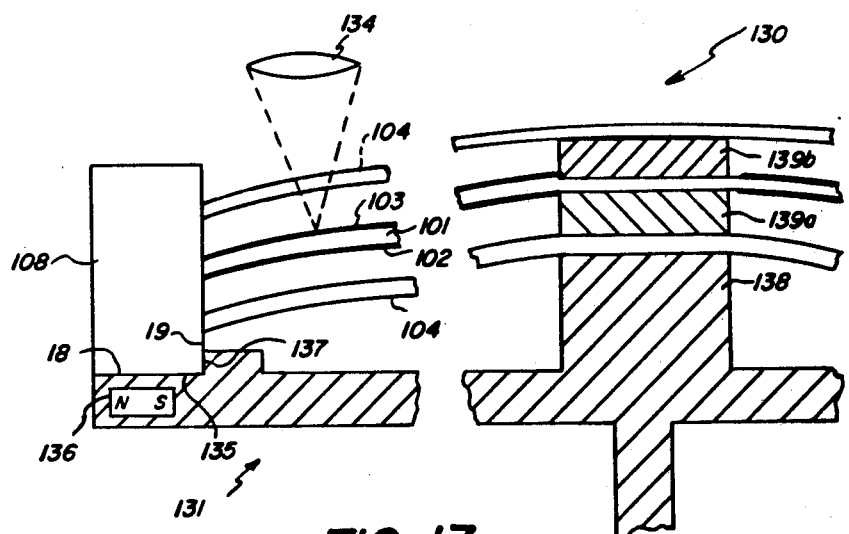

FIG. 13 illustrates another preferred optical disc-unit and cooperative apparatus configuration in accordance with the present invention. The disc-unit is similar to unit 100 and described with respect to FIG. 10; however, the unit 130 includes central spacers 139a and 139b between the disc 101 and cover sheets 104. The apparatus 131 is like that described with respect to FIG. 12 featuring central abutment surface 138 to tension disc 101 via cover sheets 104 and spacers 139a or 139b (depending on whether record layer 103 or 102 is being utilized).

Figure 14:
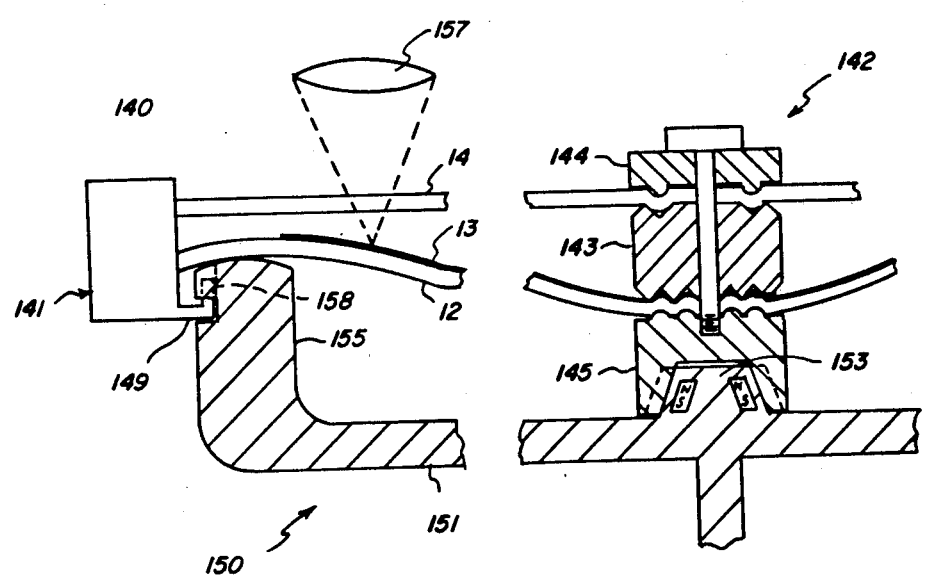

FIG. 14 illustrates an alternative disc-unit embodiment 140 which incorporates certain features of the present invention and is adapted for central engagement by the turntable 151 of cooperative write/read apparatus 150. In this embodiment the disc-unit 140 has peripheral retaining means 141 (e.g. one of the kinds previously described) and also includes a central post assembly 142 which is adapted for attachment to the turntable 151. More specifically, the post assembly includes a central spacer post portion 143 and upper and lower post portions 144 and 145 which respectively have cooperating annular groove and rib portions adapted to uniformly grip interior circular regions of the optical disc 12 and cover sheet 14. A bolt 146 couples the post assembly portions to symmetrically engage interior disc and cover sheet regions. Lower post portion is recessed and grooved to interfit with key flanges on the magnetic chuck 153 of the turntable 151.

The turntable 150 also includes annular abutment flange 155 which has reference surface 156 for tensioning and positioning the optical disc in proper relation to lens 157 when the disc-unit is seated in the magnetic chuck 153. If desired, bayonet slots 158 can be provided around the periphery of flange 155 to receive and retain cooperative lugs 149 of the disc-unit. Thus, the disc-unit retaining means 141 is inserted into turntable flange 155 and rotated to lock lugs 149 in slots 158. This also properly orients the drive transmission portions of the disc-unit with chuck 153. The central post is then pressed down to magnetically couple the disc-unit to the chuck 153. This predeterminedly tensions and locates the optical disc vis a vis the turntable 150 and lens 157.

The invention has been described in detail with particular reference to certain preferred embodiments thereof, but it will be understood that variations and modifications can be effected within the spirit and scope of the invention.

What is claimed is:

1. For use with optical disc apparatus of the kind adapted for the optical writing and/or reading of high density information and including lens means for focusing write and/or read light within an apparatus focal zone and turntable means having a surface which is rotatable about an axis in a first plane that is substantially normal to said axis and accurately located with respect to said lens means, an optical disc-unit comprising:

(a) an optical disc including a flexible, disc-shaped support and having a write and/or read portion;
   (b) a disc cover opposing said record area and comprising a flexible, disc-shaped sheet which is highly transparent to such writing and/or reading light wavelengths; and
   (c) annular retaining means, engaging said support and said sheet around their peripheral regions, for holding the write and/or read optical disc portions and opposing portions of the cover sheet in spaced relation, said disc-unit including means for positioning said unit on said surface of such apparatus turntable means so that said write and/or read portion is accurately located with respect to such apparatus focal zone.

2. The invention defined in claim 1 wherein said retaining means is constructed to hold said peripheral regions in a manner exerting cylindrically-symmetric tensioning forces on central portions of said support and said sheet.

3. The invention defined in claim 1 or 2 wherein said retaining means cooperates with said engaged peripheral regions of said support and cover sheet to form a substantial seal with respect to the external atmosphere.

4. The invention defined in claim 1 or 2 wherein said support is engaged in cylindrically-symmetric tension substantially below its elastic limit and wherein said disc-unit is constructed to position said support in a supplemental-tensioning relation with said surface of such apparatus turntable means, whereby said optical disc-unit can be stored with said optical disc in relatively lower tension and used in such apparatus in relatively higher tension.

5. The invention defined in claim 1 or 2 wherein said retaining means comprises a first member, an intermediate member and a third member, said sheet and said support being interleaved therebetween.

6. The invention defined in claim 5 wherein said first and third members hold said support and cover sheet in tension and said intermediate member is a spacer between said support and said cover sheet.

7. The invention defined in claim 6 wherein opposing surfaces of said first member and said third member have cooperating male and female portions and are disposed in inter-pressing relation with portions of said sheet and said support engaged between said male and female portions.

8. The invention defined in claim 1 wherein said retaining means is adapted to cooperate with receiving means on such apparatus turntable means in a manner which effects an accurately positioning engagement of said disc-unit support by said surface of such apparatus turntable means.

9. An optical disc write and/or read system comprising (i) write and/or read apparatus including: (1) lens means for focusing write and/or read light within a predetermined focal zone and (2) turntable means having a surface that is rotatable about an axis in a first plane that is substantially normal to said axis and accurately located with respect to said focal zone and (ii) an optical disc-unit interfitting with said apparatus and including:
(a) an optical disc including a flexible, disc-shaped support and having a write and/or read portion;
(b) a disc cover opposing said write and/or read portion and comprising a flexible, disc-shaped sheet which is highly transparent to such writing and/or reading light; and
(c) annular retaining means for holding each of said support and said sheet around respective annular peripheral regions and positioning said sheet and the write and/or read portion of said support in a spaced relation;
said surface of said turntable means engaging said disc-unit in a manner accurately positioning said write and/or read portion relative to said focal zone.

10. The invention defined in claim 9 wherein said surface of said turntable means is a tensioning abutment surface which is generally concentric to said axis, radially inward from said retaining means and in abutting engagement with said support of said disc-unit.

11. The invention defined in claim 9 wherein said surface of said turntable means is a reference surface for receiving said disc-unit retaining means and wherein said retaining means are precisely constructed so that said write and/or read portion is accurately located with respect to said focal zone.

12. The invention defined in claim 9, 10 or 11 wherein said turntable means includes axial centering means for contacting peripheral portions of said disc-unit and aligning the central axis of said disc-unit on said axis of rotation.

13. Optical disc write and/or read apparatus adapted for use with an optical disc-unit of the kind including: (i) an optical disc comprising a flexible, disc-shaped support and having a write and/or read portion and (ii) annular means for retaining said support around an annular peripheral region so as to urge said support into a generally flat condition, said apparatus comprising:
(a) lens means for focusing write and/or read light within an apparatus focal zone; and
(b) a turntable which is rotatable about a central axis and includes abutment means, precisely located relative to said focal zone, for engaging the support of such a disc-unit, when mounted on said turntable, and accurately locating such disc-unit write and/or read portion with respect to said focal zone.

14. The invention defined in claim 13 wherein said turntable includes means for receiving the retaining means of such disc-unit and said abutment means includes a tensioning abutment surface which is generally concentric to said axis and radially inward from said receiving means so that the support of a disc-unit mounted on said turntable receiving means is subjected to cylindrically-symmetric tension by said abutment surface and so that the write and/or read portion of such disc-unit is accurately located with respect to said focal zone.

15. The invention defined in claim 13 or 14 wherein said receiving means further includes axial centering means for contacting the periphery of a received disc-unit and aligning the central axis of such unit on said turntable axis.

16. The invention defined in claim 10 or 14 further including means for positively urging said retaining means onto said turntable so as to positively tension said disc-unit support via said abutment surface.

17. A method of fabricating an optical disc-unit adapted for optical writing and/or reading of high density information, said method comprising the steps of:
(a) forming an optical disc including a flexible, disc-shaped support and having a write and/or read portion;
(b) forming a disc cover including a flexible, disc-shaped sheet which is highly transparent to writing and/or reading wavelengths and of diameter approximately equal to said optical disc;
(c) forming first, intermediate and third annular retaining members of diameter approximately equal to said optical disc, said first and third members having cooperative male and female surfaces;
(d) placing said first and third members in opposing relation with said surfaces aligned for engaging peripheral regions of said support and sheet and said intermediate member between said support and sheet, radially inwardly of said surfaces of said first and third members; and
(e) manipulating said first and third members into interfitting relation so as to retain said peripheral support and sheet portions and dispose unretained support and sheet portions in cylindrically-symmetric tension.

18. The method defined in claim 17 wherein said manipulating step includes first forcing outer peripheral portions of said first and third members together to engage outer peripheral regions of said sheet and support therebetween and then forcing inner portions of said first and third members together in a manner tensioning said support and sheet.

19. The invention defined in claim 10 or 14 wherein said tensioning abutment surface protrudes above radially inward portions of said turntable opposing such disc record zone.

20. The invention defined in claim 1, 2, 9, or 10 further comprising central retaining means for engaging a substantially continuous annular region of said support and/or sheet that is radially interior of said write and/or read portion.

21. The invention defined in claim 20 wherein said central retaining means includes means for aligningly interfitting with a central turntable portion of such optical write/read apparatus.

22. The invention defined in claim 20 wherein said support and/or said cover sheet include a central aperture and said central retaining means encircles said aperture.

23. The invention defined in claim 1 or 2 wherein said positioning means of said optical disc-unit is constructed for interfitting with such apparatus turntable means to position an annular region of said support in abutting relation with an annular abutment surface of such apparatus turntable means whereby the write and/or read portion of said optical disc will be accurately located relative to the focal zone of such apparatus.

24. The invention defined in claim 1, 2, 9 or 10 wherein said support has a nominal thickness less than about 10 mils.

25. The invention defined in claim 1, 2, 9 or 10 wherein said support has a nominal thickness of about 4 mils and a Young's modulus of approximately $6.8 \times 10^5$ psi.

26. The invention defined in claim 10 or 14 wherein said abutment surface is located radially inward from the write and/or read portion of the disc-unit.

27. The invention defined in claim 1, 2, 9 or 10 wherein said annular retaining means is constructed for magnetic attraction to the turntable of such apparatus.

* * * * *